United States Patent
Han et al.

(10) Patent No.: US 6,779,059 B2
(45) Date of Patent: Aug. 17, 2004

(54) RECONFIGURABLE FLASH MEDIA READER SYSTEM

(75) Inventors: Ching-Yung Han, Sunnyvale, CA (US); Chin-Ran Lo, Taipei (TW)

(73) Assignee: O2Micro International Limited, Georgetown (KY)

( * ) Notice: Subject to any disclaimer, the term of this patent is extended or adjusted under 35 U.S.C. 154(b) by 100 days.

(21) Appl. No.: 09/998,437

(22) Filed: Nov. 30, 2001

(65) Prior Publication Data

US 2003/0041188 A1 Feb. 27, 2003

Related U.S. Application Data

(60) Provisional application No. 60/314,107, filed on Aug. 21, 2001.

(51) Int. Cl.[7] .............................................. G06F 13/12
(52) U.S. Cl. .............................. 710/62; 710/11; 710/72
(58) Field of Search ........................... 710/11, 300, 301, 710/302, 62

(56) References Cited

U.S. PATENT DOCUMENTS

| | | | |
|---|---|---|---|
| 5,748,915 A | 5/1998 | Iijima | 395/285 |
| 6,137,710 A * | 10/2000 | Iwasaki et al. | 365/52 |
| 6,145,046 A * | 11/2000 | Jones | 710/129 |
| 6,148,354 A * | 11/2000 | Ban et al. | 710/102 |
| 6,157,966 A * | 12/2000 | Montgomery et al. | 710/8 |
| 6,168,077 B1 | 1/2001 | Gray et al. | 235/375 |
| 6,199,128 B1 * | 3/2001 | Sarat | 710/102 |
| 2001/0000405 A1 * | 4/2001 | Gray et al. | 235/375 |

FOREIGN PATENT DOCUMENTS

TW 446151 Y 7/2001 .......... G60K/19/00

OTHER PUBLICATIONS

Newton, Harry; Newton's Telecom Dictionary; 2002; CMP Books; 18th edition, pp. 381–382 and 703.*

"International Standard", ISO/IEC 7816–10, First Edition, Nov. 1, 1999, Identification Cards—Integrated Circuit(s) cards with contacts, Part 10: Electronic signals and answer to reset for synchronous cards.

"International Standard", ISO/IEC 7816–3, Second Edition, Dec. 15, 1997, Information Technology—Identification cards—Integrated circuit(s) cards with contacts, Part 3: Electronic signals and transmission protocols.

English translation of Taiwan First Office Action for corresponding Taiwan application.

* cited by examiner

Primary Examiner—Fritz Fleming
Assistant Examiner—Alan Chen
(74) Attorney, Agent, or Firm—Grossman, Tucker, Perreault & Pfleger, PLLC

(57) ABSTRACT

A reconfigurable flash media reader system provides a flash media reader that accepts both asynchronous and synchronous flash media cards. The reader identifies the card type of the inserted flash media card and notifies the host computer of the card type. The host computer has a list of interface information for different types of flash media cards and references the card type in the list and sets the proper baud rate on the reader. If the flash media card is a synchronous card, data that is to written into the flash media card is gathered and converted to the proper card IO strobes for the card type which are interleaved with the proper card clock strobes for the card type into a bit stream in a bulk transfer packet. The reader extracts the data bit stream from said bulk transfer packet and clocks the data bit stream into the flash media card using the baud rate as a reference clock.

16 Claims, 5 Drawing Sheets

RECONFIGURABLE FLASH MEDIA READER SYSTEM

This application claims the benefit of Provisional Application No. 60/314,107 filed Aug. 21, 2001.

BACKGROUND OF THE INVENTION

1. Technical Field

The invention relates to smart card readers. More particularly, the invention relates to smart card readers that interface to both asynchronous and synchronous smart cards.

2. Description of the Prior Art

Smart cards are typically the same size as a conventional credit card. They are referred to as smart cards because they contain an embedded microchip. Smart cards are capable of storing personalized electronic data that can be used to authenticate a user to the user's computer, and to authenticate the user during related e-commerce transactions. This technology, which requires both smart card reader hardware and software components for data transactions, effectively increases security and enables authorized users to have access to sensitive data and/or to enter into binding transactions. Because of the increased network security they provide, smart cards are often used for trusted e-commerce and digital transaction security.

Today, smart cards are used in virtually every aspect of the high technology industry—from commerce applications to identification, from benefits management to Internet/e-commerce transactions, and from telecommunications to broadcast television downloads. The increase in use of computer networks and the emergence of the Internet as a mechanism for both e-commerce and e-communication has accelerated the growth of demand, and the applications available, for smart cards.

Because a smart card can store information to protect privacy and data security, while strictly and precisely limiting access to such data, smart cards are becoming a favorable choice for computer and Internet access. In this type of application, the smart card becomes a secure extension of a computer network. As a result, computer manufacturers increasingly include smart card readers in the computer products that they offer to their customers. In this way, such products are able to meet today's on going e-business security challenge in Internet access, network access, and electronic transactions.

Smart cards come in two flavors (as well as many formats): asynchronous and synchronous. The asynchronous smart cards are true "smart" cards because they contain a built-in CPU. The built-in CPU communicates with the attached computer through the smart card reader and manipulates the data stored in the smart card's memory. Asynchronous cards are typically considered more expensive because of the built-in CPU.

Synchronous cards, on the other hand, do not have a built-in CPU and are considerably lower in cost than asynchronous smart cards. The synchronous cards are basically memory cards, sometimes with some built-in security.

The smart card reader interface is fairly standardized with respect to asynchronous smart cards. However, the communications interface with synchronous smart cards are not standardized. This means that different manufacturers have different data clock rates for writing data to the synchronous smart card's memory, resulting in dedicated smart card readers for each type of synchronous smart card.

Further, a large number of smart card readers use USB connections to interface to the user's computer. The USB driver architecture is inherently slower than PCI or RS232/PS2 standards because of the communications overhead. The drawback to using USB smart card readers is that the USB data rates are not ideal for reading or writing data to synchronous smart cards, i.e., the USB smart card readers cannot take full advantage of the synchronous smart card's data bandwidth.

It would be advantageous to provide a reconfigurable flash media reader system that is adaptable to both asychronous and synchronous smart cards. It would further be advantageous to provide a reconfigurable flash media reader system that is increases the data bandwidth for synchronous smart cards over a USB connection.

SUMMARY OF THE INVENTION

The invention provides a reconfigurable flash media reader system. The system allows a flash media reader to dynamically adapt to differing types of synchronous flash media cards as well as asynchronous flash media cards. In addition, the invention provides a system that increases a USB flash media reader's data bandwidth for synchronous flash media cards.

A preferred embodiment of the invention provides a flash media reader that accepts both asynchronous and synchronous flash media cards. The flash media reader is connected to a host computer via a Universal Serial Bus (USB). The flash media reader identifies the card type of the inserted flash media card and notifies the host computer of the card type.

The host computer has a list of interface information for different types of flash media cards. The flash media card type is referenced in the interface information list and the proper baud rate is then set on the flash media reader by the host computer.

If the flash media card is a synchronous card, data that is to written into the flash media card is gathered and converted to the proper card IO strobes for the flash media card type. The converted card IO strobes are interleaved with the proper card clock strobes for the flash media card type into a bit stream in a bulk transfer packet. The bulk transfer packet is sent via the USB link to the flash media reader.

The flash media reader receives the bulk transfer packet and extracts the data bit stream from said bulk transfer packet. The data bit stream is clocked into the flash media card using the baud rate as a reference clock. Clock and IO signals on the flash media card are strobed according to the interleaved card clock and card IO signals from the data bit stream.

Data is retrieved from the flash media card by calculating the number of clock cycles required to clock out the data from the flash media card. The host computer sets the appropriate baud rate on the flash media reader to accomplish the data read. After the calculated number of clock cycles are completed, the host computer issues a bulk in transfer command to the flash media reader. The flash media reader responds to the bulk in transfer command by sending a bulk in transfer packet containing the data clocked out of the flash media card to the host computer.

Other aspects and advantages of the invention will become apparent from the following detailed description in combination with the accompanying drawings, illustrating, by way of example, the principles of the invention.

DETAILED DESCRIPTION OF THE INVENTION

Figure 1:
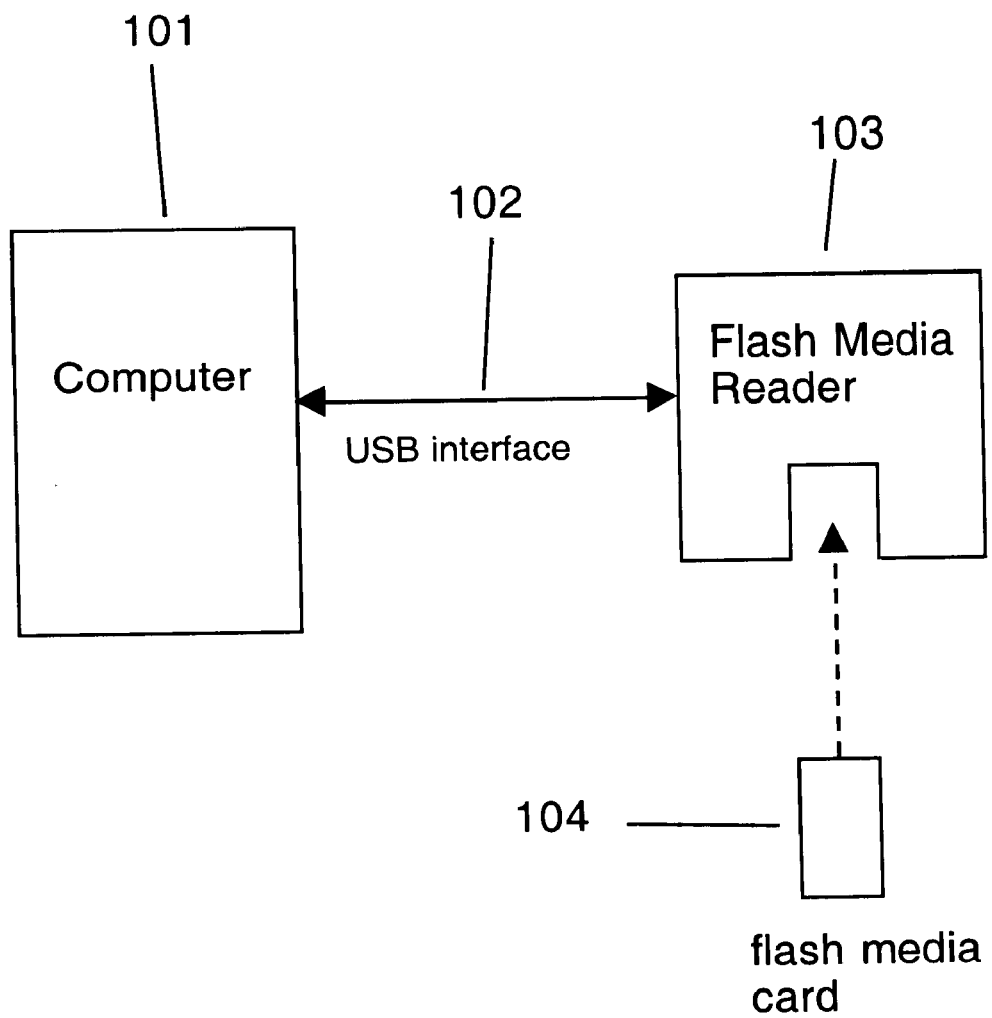
FIG. 1 is a block schematic diagram of a USB interfaced reconfigurable flash media reader and host computer according to the invention.

The invention is embodied in a reconfigurable flash media reader system in a computer environment. A system according to the invention allows a flash media reader to dynamically adapt to differing types of synchronous flash media cards as well as asynchronous flash media cards. In addition, the invention provides a system that increases the bandwidth of data accesses to synchronous flash media cards over a USB connected flash media reader.

Public Key Infrastructure (PKI) is fast becoming an important feature to end users. This is due to the expansive popularity of the digital appliance, e-commerce security, and digital signature markets. PKI lends itself to the use of smart cards, or flash media, for portable, compact security applications. Flash media plays a very important role in the exchange of data between digital appliances, e.g., digital cameras, camcorders, etc., and the PC.

Current incarnations of PCs have a plurality of built-in USB ports that are supported by different operating systems (OS) such as Mac, Windows, and Linux. A smart card (flash media) reader is connected to the PC. The smart card reader reads the user's smart card when it is inserted into the reader. The most common methods of connecting smart card readers to PCs are: PCI; RS232/PS2; and Universal Serial Bus (USB).

The USB (see Universal Serial Bus Specification 1.1, Copyright© 1998, Compaq Computer Corporation, Intel Corporation, Microsoft Corporation, NEC Corporation, available at http://www.usb.org) was originally developed in 1995. The major goal of USB was to define an external expansion bus which makes adding peripherals to a computer as easy as hooking up a telephone to a wall-jack.

USB devices are hot pluggable making them convenient and easier to use than other devices. This makes USB flash media readers more attractive and acceptable to end users.

The flash media card comes in several different formats such as the smart card, Sony-MS, Toshiba-SD, Compaq flash, smart media, MMC, etc. Each format can have different levels of built-in security or no built-in security. For example, the smart card format has a CPU built into the card. Synchronous cards such as Sony's memory stick have no built-in security while Sony's magic gate has built-in security.

The cost of flash media varies with the level of built-in security. For example, a smart card with an on-board CPU costs $3 to $6 compared to synchronous cards which cost only $0.20 to $0.40, depending on the memory size.

In the current PC industry, as in most consumer industries, keeping the price/cost down is very important to the market. The use of high cost flash media cards like the CPU type of smart card, are not required in many applications. Low cost synchronous cards can be used to achieve the desired results. Therefore, it is desirable that smart card readers support synchronous cards as well as asynchronous cards.

Synchronous cards have a relatively high data throughput because the synchronous cards are memory devices and do not have on-board CPUs. Data is clocked in and out of synchronous cards by the smart card reader.

Synchronous cards are not standardized in the industry and memory clock specifications vary among manufacturers. This is done purposely by the manufacturers so that a specialized flash media reader is required to read their specific synchronous flash media cards.

Generally, PCI and RS232/PS2 smart card readers have enough bandwidth across the PCI or RS232/PS2 connection to transfer data to and from synchronous smart cards to utilize a large portion of the available data bandwidth of the synchronous card. However, the USB standard requires that communication is performed via packets.

Communication overhead, caused by the packet approach, adds a latency factor between the computer and the smart card reader. The loss of bandwidth due to the packet overhead causes the smart card reader to access synchronous cards at a much slower rate than with PCI or RS232/PS2. USB smart card readers therefore have slower synchronous data access speeds and poorer performance when compared to PCI or RS232/PS2 smart card readers.

Prior approaches control the synchronous smart card clock and I/O through specialized hardware. However, the hardware approach is limited in the types of synchronous cards that can be supported in one hardware implementation because synchronous cards are not standardized.

Another approach uses the USB control transfer packet to program the clock and I/O registers on smart card readers to generate the necessary synchronous smart card clock and I/O. However, the performance of USB readers using this approach is poor due to the limitations of the USB transfer architecture and bus speed.

A preferred embodiment of the invention increases the throughput of USB flash media readers (i.e., smart card reader, smart media reader, etc.) for synchronous flash media cards. The invention provides a system that intelligently adapts to the specific type of flash media card inserted into the flash media reader. The data clock rate of the flash media reader is configured remotely to adapt to specific synchronous flash media cards.

The invention allows a USB flash media reader to support a variety of low cost synchronous cards (e.g., synchronous smart card, Sony-MS, etc.) and to meet performance requirements associated with such cards. Synchronous card support is easily integrated with asynchronous card support within a single flash media reader.

Referring to FIG. 1, the data read and write performance is dramatically increased without requiring extra circuits in the media reader chip. When the user inserts a flash media card 104 into the Flash Media Reader 103. The Flash Media Reader 103 is a USB device with an integrated flash media reader that complies with the ISO/IEC-7816 standard. The Flash Media Reader 103 identifies the flash media card 104. Flash Media Reader 103 informs the host PC 101 across the USB connection 102 the type of card that has been inserted.

Asynchronous cards communicate with the Flash Media Reader 103 at their own CPU's pace. An asynchronous card's intelligence allows it to operate in a message format rather than the straight data reads and writes that synchronous cards require.

If the card is a synchronous card, the PC 101 looks up the flash media interface information (e.g., smart card clock and smart card I/O) for that specific synchronous card type. The PC 101 programs the flash media interface information and combines the interface information by using an interleaving method to create the data for a USB bulk transfer. The PC 101 then issues bulk transfers across the USB 102, sending the data to the Flash Media Reader 103. When the Flash Media Reader 103 receives a bulk transfer data packet, it extracts the interface information (e.g., smart card clock and I/O) from the data and generates the flash media interfaces to the flash media card 104, writing data to the flash media card 104.

The invention easily adapts to different flash media types by programming each type's interface formats into the reader, thereby meeting each flash media's requirements. Further, because the USB bulk transfer packet is used, data write performance is greatly enhanced.

The USB standard defines four data transfer types: control, isochronous, interrupt, and bulk. The bulk transfer type targets USB devices such as printers, scanners, and digital cameras that move large amounts of data to or from the PC over USB. The bulk transfer type transfers up to 64 bytes at a time.

Figure 2:
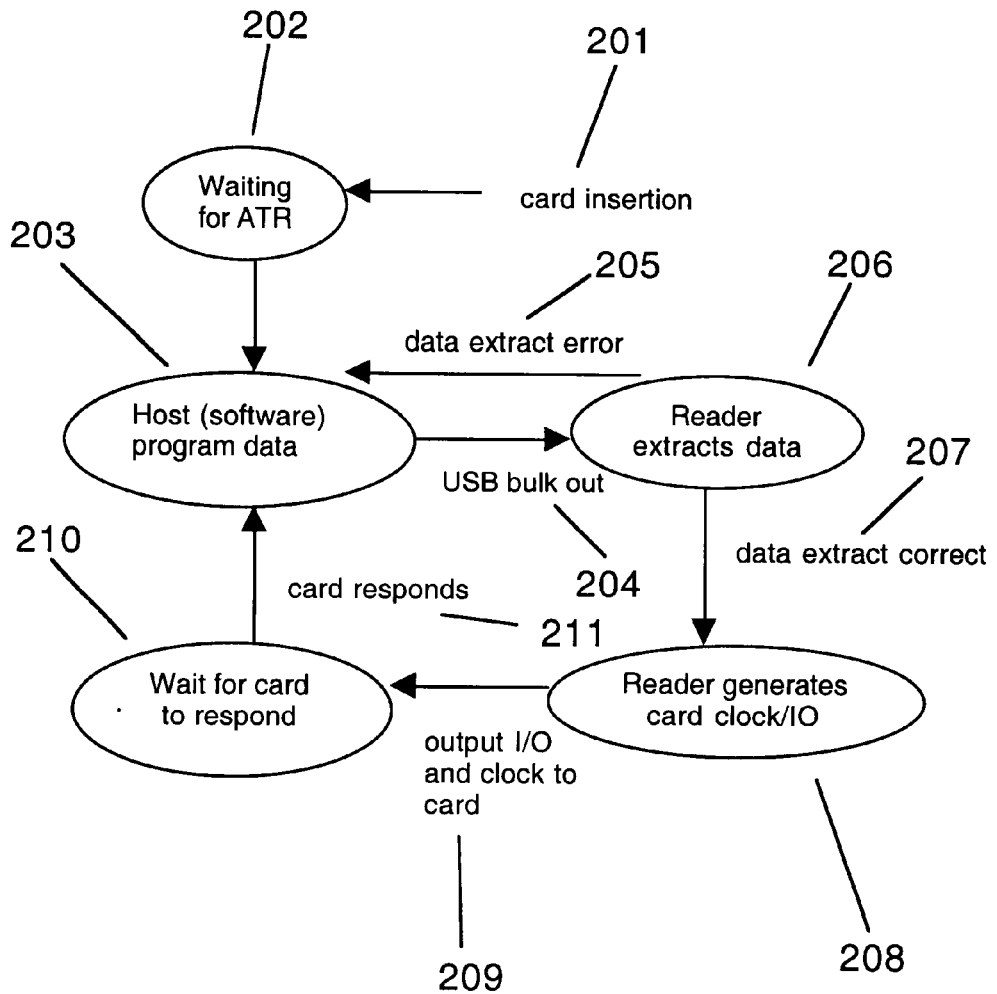
FIG. 2 is a block schematic diagram of a state diagram of a preferred embodiment of the invention according to the invention.

With respect to FIG. 2, a state diagram of the invention's flash media reader and configuration system is shown. A flash media card is inserted 201 into the reader. The card is powered up and the reader waits for an Answer To Reset (ATR) from the card 202. After the card responds with the ATR, the host takes control over the data exchange with the flash media card interface 203. The host issues a USB control transfer to write to the reader's internal registers. It looks up the reader's interface information and assembles data packets by combining the interface information and data to be written to the card into USB bulk transfer packets. The USB bulk transfer packets are sent to the reader 204.

The reader receives the USB packets and recognizes the USB bulk transfer packets. It extracts the data from the USB bulk transfer packet 206. The reader verifies the data 207 (or reports a data extract error 205 to the host) and uses its internal baud rate as the reference clock to generate card clock and card IO signals to the flash media card 208, 209. When the data has been written to the card 210, the card responds 211 and the write cycle continues.

Figure 3:
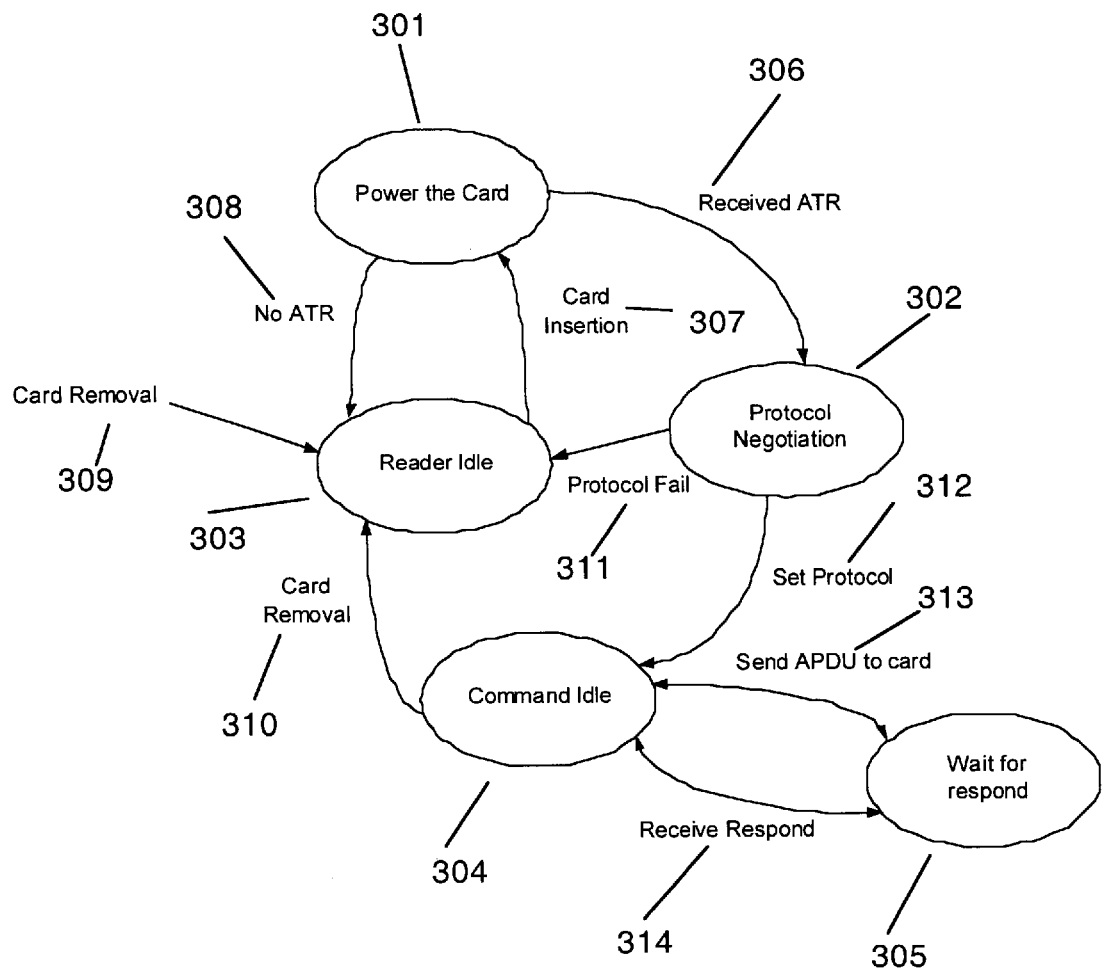
FIG. 3 is a block schematic diagram of a state diagram of a reconfigurable flash media reader according to the invention.

Referring to FIG. 3, an exemplary state diagram is shown for the flash media reader. The reader idle state is the normal state 303 where the reader waits for a card to be inserted. When a card is inserted 307, the reader powers the card 301. The reader waits for the ATR from the card 301. If the reader times out before an ATR is received 308, it transitions back to the idle state 303. Otherwise, the card answers with an ATR 306 and the reader begins protocol negotiation with the card 302.

If the protocol negotiation fails 311, the reader goes back to the idle state 303. If the card communicates with the reader 312, then the reader transitions to the command state 304. As each command arrives from the host, the reader sends the appropriate APDU commands (as defined in ISO 7816-4 section 5.3) to the card 313 and waits for a response 305. When the card responds 314, the reader continues with the command state 304. If the card is removed at any time 309, 310, the reader returns to the idle state 303.

Figure 4:
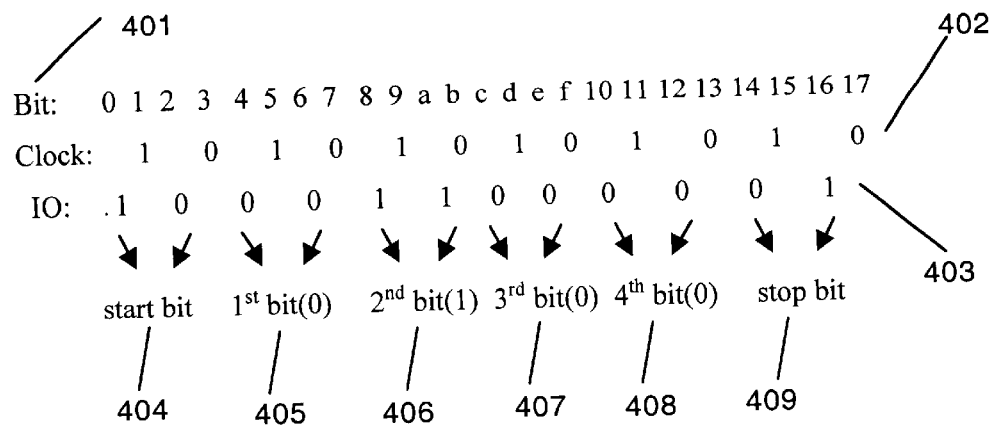
FIG. 4 is a schematic diagram of data and clock transitions from a bulk transfer data stream according to the invention.
Figure 4:
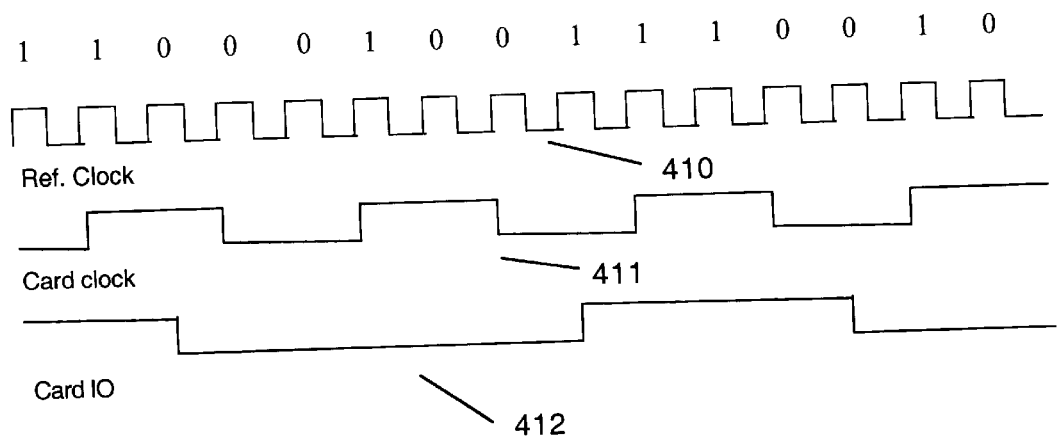

With respect to FIGS. 1 and 4, the host 101 assembles each bulk transfer packet by interleaving the data with the card clock and card IO signals. Each type of synchronous card has a required clock frequency and specification for clocking data in and out of the on-board memory. Within the bulk transfer packet bit stream are the card clock strobes and card IO clock timing. The data is converted into the proper card IO strobes for the specific card type. The timing is specified in the bit pattern within the data in the bulk transfer packet. The reader's 103 baud rate frequency is set by the host 101 when the card type is identified.

The host 101 then sends the bulk transfer packet to the reader 103. The reader 103 uses the baud rate frequency as an internal reference clock to clock out the bits in the bulk transfer packet data. Based on the baud rate, bulk out data bits 0, 2, 4, 6, . . . are the card IO, and bits 1, 3, 5, 7, . . . are the card clock.

For example, to write the data pattern "0100" to the card 104, the host performs the following steps:
 1. After ATR, issue Control_write (reg38, 03h). bit[0]: Icc in tx mode. Bit[1]: atr done.
 2. bulk_out (1100010011100100001000110)

The reader 103 decodes the bits in the data of the bulk_out packet. The bit positions are indicated in 401. Reference clock 410 is derived from the reader's 103 baud rate frequency set by the host 101. The card clock 411 of the card 104 is strobed using bits 1, 3, 5, 7, . . . of the data bits 402. Card IO 412 is derived from bits 0, 2, 4, 6, . . . of the data bits 403. The start bits 404 are from bits 0H and 2H, data bit 1 (=0) 405 from bits 4H and 6H, data bit 2 (=1) 406 from bits 8H and aH, data bit 3 (=0) 407 from bits cH and eH, data bit 4 (=0) 408 from bits 10H and 12H, and the stop bits 409 from bits 14H and 16H.

To receive data from the card 104, the host 101 determines the number of clock cycles that need to be generated for the data being retrieved from the card 104. The host 101 then sets the baud rate frequency on the reader to generate the card clock. After the number of clock cycles are completed, the host 101 issues a bulk in transfer to read the data extracted from the card 104.

Figure 5:
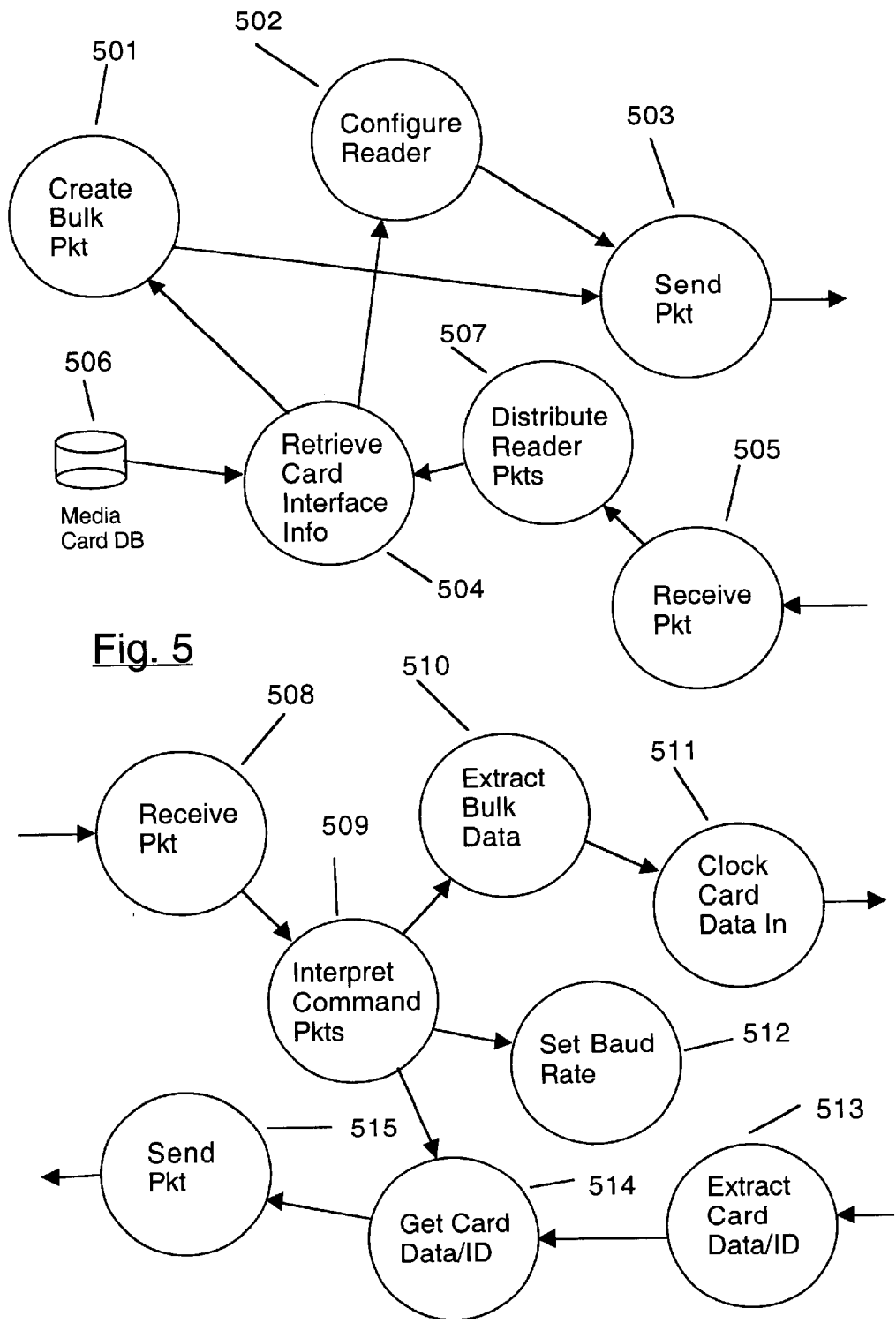
FIG. 5 is a block schematic diagram of a task viewpoint of a preferred embodiment of the invention according to the invention.

Referring to FIG. 5, a task viewpoint of the invention is shown. When a card is inserted into the reader, the Get Card Data/ID module 514 retrieves the card type from the flash media card through the Extract Card Data/ID module 513. The Get Card Data/ID module 514 sends the card type to the host through the Send Pkt module 515.

The host receives the card ID from the reader through the Receive Pkt module 505. The Distribute Reader Pkts module 507 routes reader packets to the correct module and forwards the card ID to the Retrieve Card Interface Info module 504. Flash media card interface information for the particular card is retrieved from the Media Card database 506 by the Retrieve Card Interface Info module 504. The Retrieve Card Interface module 504 distributes the card interface information to the modules that need the information such as the Create Bulk Pkt module 501 and Configure Reader module 502.

The reader's baud rate and any other configuration registers are set by the Configure Reader module 502. The proper baud rate is calculated for the reader, based on the card type, to use as a reference clock by the Configure Reader module 502 and a packet is sent through the Send Pkt module 503 to the reader to set the baud rate register.

Host packets are received by the Receive Pkt module 508 on the reader and sent to the Interpret Command Pkts module 509. The baud rate on the reader is set by the Set Baud rate module 512.

The host then assembles the bulk transfer packets in the Create Bulk Pkt module 501. The data to be written to the card is interleaved with the card clock and clock IO signals that correspond to the card type. Bit strobes are generated for the data and signals based on the card type. Bulk transfer packets are sent to the reader through the Send Pkt module 503. Bulk transfer packets are routed through the reader to the Extract Bulk Data module 510.

The Extract Bulk Data module 510 extracts the data bit stream from the bulk transfer packet. Extracted data is written to the card by the Clock Card Data In module 511. The Clock Card Data In module 511 uses the reader's baud rate as a reference clock to clock the data stream bits into the card. The card clock is toggled using the even bits of the data stream for the data IO clock and the card clock is toggled using the odd bits of the data stream.

Data reads from the card are performed by the Extract Card Data/ID module 513. The host calculates the number of clock cycles required to clock out the data from the card and sets the appropriate baud rate on the reader via the Configure Reader module 502. The Receive Pkt module 508 on the reader receives the command packet routes it to the Interpret Command Pkts module 509 and sets the baud rate in the Set Baud rate module 512. The data is clocked out of the card using the Extract Card Data/ID module 513.

The Get Card Data/ID module 514 gathers the extracted data. After the number of clock cycles are completed, the host issues a bulk in transfer via the Send Pkt module 503, to read the data extracted from the card. The bulk in transfer command is routed through the Interpret Command Pkts module 509 to the Get Card Data/ID module 514. The Get Card Data/ID module 514 creates the bulk in transfer packet using the data retrieved from the card and sends the packet to the host via the Send Pkt module 515 on the reader. The host receives the packet through the Receive Pkt module 505 and the Distribute Reader Pkts module 507 sends the bulk in transfer packet to the requesting task.

One skilled in the art will readily appreciate that, although the USB communication protocol is specifically mentioned herein, the invention can be used in any other communications protocol that has a slower throughput than the synchronous flash media being used. For example, as the speed of synchronous flash media cards increases, the RS232/PS2 card readers will not be able to keep up with the cards. The invention can be implemented by sending bulk data packets to the reader via the RS232/PS2 connection. The bulk data packets are used to clock the data into the faster flash media cards at a higher rate than the RS232/PS2 transfer rate. The invention also allows readers to dynamically adapt to different types of synchronous cards while being able to support asynchronous cards.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

What is claimed is:

1. A process for a Universal Serial Bus (USB) remotely reconfigurable flash media reader that is adaptable to both synchronous and asynchronous flash media cards, comprising the steps of:
    providing flash media identification means on said reader for identifying the card type of a flash media card inserted into said flash media reader;
    wherein said flash media reader sends said card type to said host computer via a USB link;
    providing reader configuration means on said host computer for configuring said flash media reader according to said card type;
    providing bulk data creation means on said host computer for converting data to be written into said flash media card to the proper card IO strobes for said card type and interleaving the converted card IO strobes with the card clock strobes for said card type into a bulk transfer packet if said card is a synchronous card;
    sending said bulk transfer packet via the USB link to said flash media reader;
    providing card data retrieval means on said host computer for retrieving data from said flash media card on said flash media reader;
    wherein said card data retrieval means calculates the number of clock cycles required to clock out the data from said flash media card and notifies said reader configuration means of the appropriate baud rate to set on said flash media reader;
    wherein said flash media reader clocks data out of said flash media card using said appropriate baud rate;
    wherein after said calculated number of clock cycles are completed, said card data retrieval means issues a bulk in transfer command to said flash media reader via the USB link; and
    wherein said flash media reader responds to said bulk in transfer command by sending a bulk in transfer packet containing the data clocked out of said flash media card to said card data retrieval means via the USB link.

2. The process of claim 1, further comprising the steps of:
    providing card type storage means for storing the interface information for a plurality of flash media card types; and
    wherein said reader configuration means looks up said card type in said card type storage means and retrieves the proper configuration information.

3. The process of claim 2, wherein said interface information contains the card clock and card IO specifications for each card type, and wherein said bulk data creation means looks up said card type in said card type storage means and retrieves the proper card clock and card IO information.

4. The process of claim 1, wherein said reader configuration means sends a command packet via the USB link to said flash media reader setting the baud rate of said flash media reader according to said card type, and wherein said flash media reader receives said command packets and sets its baud rate accordingly.

5. The process of claim 1, further comprising the step of:
    providing bulk data extraction means on said flash media reader for extracting the data bit stream from said bulk transfer packet.

6. The process of claim 5, further comprising the step of:
    providing means for clocking said data bit stream into said flash media card.

7. The process of claim 6, wherein said clocking means uses said flash media reader's internal baud rate as a reference clock for clocking said data bit stream into said flash media card.

8. The process of claim 6, wherein said clocking means extracts the interleaved card clock and card IO signals from said data bit stream and strobes said flash media card's clock and IO signals according to said signals.

9. An apparatus for a Universal Serial Bus (USB) remotely reconfigurable flash media reader that is adaptable to both synchronous and asynchronous flash media cards, comprising:
    flash media identification means on said reader for identifying the card type of a flash media card inserted into said flash media reader;
    wherein said flash media reader sends said card type to said host computer via a USB link;

reader configuration means on said host computer for configuring said flash media reader according to said card type;

bulk data creation means on said host computer for converting data to be written into said flash media card to the proper card IO strobes for said card type and interleaving the converted card IO strobes with the card clock strobes for said card type into a bulk transfer packet if said card is a synchronous card;

a module for sending said bulk transfer packet via the USB link to said flash media reader and card data retrieval means on said host computer for retrieving data from said flash media card on said flash media reader;

wherein said card data retrieval means calculates the number of clock cycles required to clock out the data from said flash media card and notifies said reader configuration means of the appropriate baud rate to set on said flash media reader;

wherein said flash media reader clocks data out of said flash media card using said appropriate baud rate;

wherein after said calculated number of clock cycles are completed, said card data retrieval means issues a bulk in transfer command to said flash media reader via the USB link; and wherein said flash media reader responds to said bulk in transfer command by sending a bulk in transfer packet containing the data clocked out of said flash media card to said card data retrieval means via the USB link.

10. The apparatus of claim 9, further comprising:

card type storage means for storing the interface information for a plurality of flash media card types; and wherein said reader configuration means looks up said card type in said card type storage means and retrieves the proper configuration information.

11. The apparatus of claim 10, wherein said interface information contains the card clock and card IO specifications for each card type, and wherein said bulk data creation means looks up said card type in said card type storage means and retrieves the proper card clock and card IO information.

12. The apparatus of claim 9, wherein said reader configuration means sends a command packet via the USB link to said flash media reader setting the baud rate of said flash media reader according to said card type, and wherein said flash media reader receives said command packet and sets its baud rate accordingly.

13. The apparatus of claim 9, further comprising:

bulk data extraction means on said flash media reader for extracting the data bit stream from said bulk transfer packet.

14. The apparatus of claim 13, further comprising:

means for clocking said data bit stream into said flash media card.

15. The apparatus of claim 14, wherein said clocking means uses said flash media reader's internal baud rate as a reference clock for clocking said data bit stream into said flash media card.

16. The apparatus of claim 14, wherein said clocking means extracts the interleaved card clock and card IO signals from said data bit stream and strobes said flash media card's clock and IO signals according to said signals.

* * * * *